United States Patent
deCarmo

(10) Patent No.: US 6,643,450 B1
(45) Date of Patent: Nov. 4, 2003

(54) DIGITAL VERSATILE DISC PLAYBACK SYSTEM WITH PROGRAM CHAIN OBJECT SEARCHING CAPABILITIES

(75) Inventor: Linden A. deCarmo, Plantation, FL (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/182,606

(22) Filed: Oct. 29, 1998

(51) Int. Cl.[7] ............................. H04N 5/91; H04N 5/90; H04N 5/85; H04N 5/781
(52) U.S. Cl. ......................................... 386/94; 386/125
(58) Field of Search ................................. 386/1, 45, 70, 386/94, 95, 125–126, 30; 360/60; 380/201, 203

(56) References Cited

U.S. PATENT DOCUMENTS

| | | | | |
|---|---|---|---|---|
| 5,576,755 A | * | 11/1996 | Davis et al. | 348/13 |
| 5,691,972 A | * | 11/1997 | Tsuga et al. | 369/275.3 |
| 5,813,010 A | * | 9/1998 | Kurano et al. | 707/100 |
| 5,854,873 A | * | 12/1998 | Mori et al. | 386/92 |
| 5,907,659 A | * | 5/1999 | Yamauchi et al. | 386/95 |
| 5,913,013 A | * | 6/1999 | Abecassis | 386/125 |
| 5,915,067 A | * | 6/1999 | Nonomura et al. | 386/70 |
| 5,923,627 A | * | 7/1999 | Miwa et al. | 386/70 |
| 5,933,569 A | * | 8/1999 | Sawabe et al. | 386/94 |
| 6,009,433 A | * | 12/1999 | Kurano et al. | 707/100 |
| 6,512,883 B2 | * | 1/2003 | Shim et al. | 386/95 |

* cited by examiner

Primary Examiner—Thai Tran
Assistant Examiner—Polin Chieu
(74) Attorney, Agent, or Firm—Kudirka & Jobse, LLP

(57) ABSTRACT

A digital versatile disc (DVD) playback apparatus is disclosed for searching program chain (PGC) objects within a DVD content source. The DVD playback apparatus includes a DVD reader for reading a DVD content source and a user input device for receiving user commands. The DVD content source comprises a plurality of PGC objects and the DVD playback apparatus is able to search among the PGC objects using the following mechanisms. A PGC object pointer allocating mechanism is provided that is configured to allocate a unique pointer to each PGC object on the DVD content source. Once the PGC object pointers are allocated, a PGC search mechanism, which is coupled to the PGC pointer allocating mechanism, performs searches for a requested PGC object using a pointer assigned to the desired PGC object. Selected of the PGC objects are allocated to at least one data block while the remaining are considered to be non-block objects. The PGC pointers are place within a linear array for searching.

15 Claims, 4 Drawing Sheets

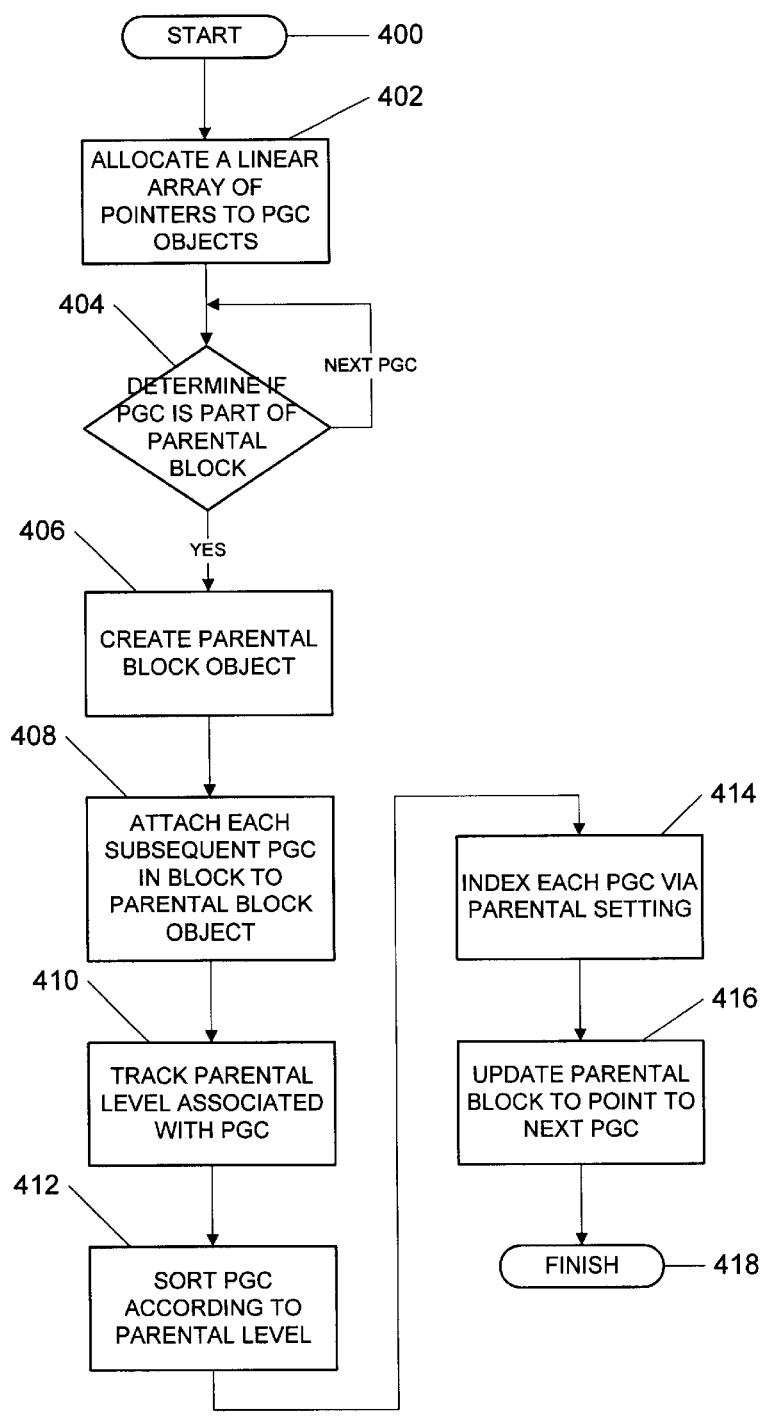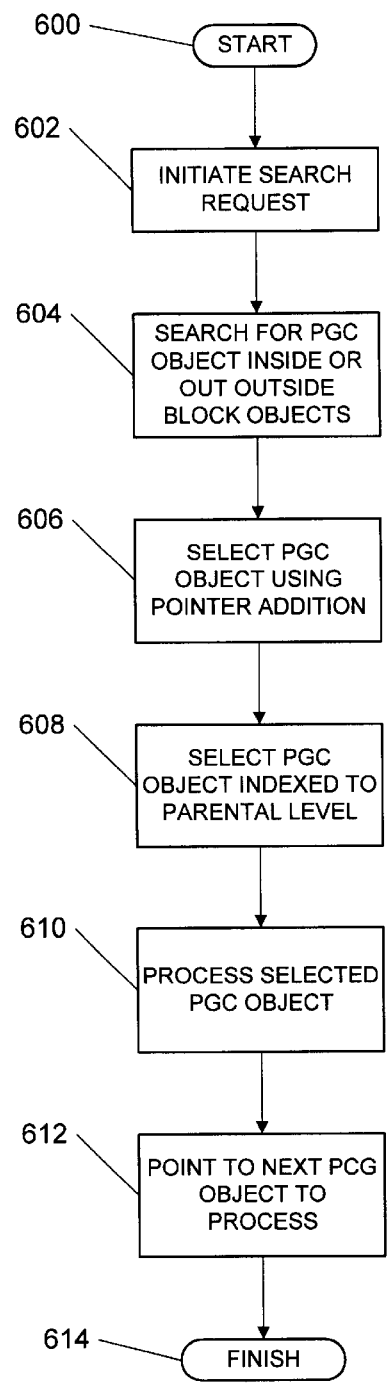
FIG. 4
FIG. 6

DIGITAL VERSATILE DISC PLAYBACK SYSTEM WITH PROGRAM CHAIN OBJECT SEARCHING CAPABILITIES

FIELD OF THE INVENTION

This invention relates generally to improvements in digital versatile disc systems and, more particularly, to an improved system for searching program chain objects in DVD content.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDs) and DVD players and software use the same laser technology as CD players. Briefly, both DVDs and CDs store information as a pattern of pits formed in a metallic substrate. The pit patterns form digital words and the digital words are read by shining a laser beam on the disc surface and detecting the reflected beam. However, the information storage capacity of a typical DVD is much higher than a CD. Presently available DVDs have a variety of capacities that depend on the technology used to manufacture the discs. Single-layer technologies can be either single or double-sided with capacities of 4.7 gigabytes and 9.4 gigabytes, respectively. Dual layer technologies are available which use single or double-sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs that are used to store video information (hereinafter called DVD-VIDEO discs) may use various known information compression algorithms, such as MPEG-2 for video compression/decompression. A DVD may also include high fidelity sound as well. In addition, a DVD may also store uncompressed linear Pulse Code Modulated data streams, which have sample rates between 48–96 kHertz and are sampled at 16 or 24 bits. Still other DVD versions (hereinafter called DVD-ROM discs) can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD_VIDEO disc be referenced in predetermined directory structure.

In particular, each DVD-VIDEO disc contains a main directory denoted as a VIDEO_TS directory, which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode. Program chains allow a particular program sequence to be changed during playback. Thus, it is possible to change the program contact based on stored information. This type of operation is used in implementing "parental control" levels in which information content that parents might find inappropriate (such as extremely violent or sexual material) can be removed during playback and other material substituted without requiring several separate and complete programs.

The parental control levels are achieved by placing sensitive information in a parental block. A parental block contains two or more program chain objects and each object controls material associated with a particular parental control setting. Only one program chain (PGC) object in a parental block may be shown to the user. It is desirable to perform parental control searching within DVD content. Generally, it is desirable to perform searching within a program block, such as a parental block, containing two or more program chain objects. In order to perform PGC searching within a particular block there are two known approaches within DVD systems. The first is to perform a linear search within a linked-list for all PGC objects. The second method is to perform a search within an array for all PGC objects.

FIG. 1 is a conceptual drawing of parental block 10 that has a plurality of program chain objects 12, 14, and 16. The first PGC object 12 in parental block 10 can be directly referenced. Unfortunately, due to the specification for DVD players, the remaining PGC objects 14 and 16, which in this case represent two through n number of PGC objects, can only be accessed based on the current parental level setting. Further, no random accessing is possible to select a desired PGC object within a particular parental block. Each PGC object within the parental block must be checked to determine the one associated with the current parental level setting. Depending upon this setting there may be up to sixteen excess checks per block to determine the correct PGC object. Since there are no guarantees that each parental block contains a PGC object associated with a parental setting, and that there may be potentially thousands of parental blocks in a title, the magnitude of the wasted checks is significant during playback. Furthermore, there is no simple solution to determine parental block size. Once the appropriate PGC within a parental block has commenced playing, there is no method that allows the system to jump out of a particular parental block and play the following PGC, even if that PGC is within the same parental block.

The linked list method for searching for specific PGC objects must sort through all the PGCs on the DVD content. Each PGC object within a parental block is then flagged as being part of a block. This supports playback of the appropriate PGC objects for the current parental level setting. Unfortunately, the use of a linked list does not permit direct random access to a specific PGC number. Furthermore, the linked list approach suffers from the inherent limitations of the parental management block structure in lacking a method to sort through other objects via an identifying number.

The use of an array for searching all PGC objects is even more time consuming than the linked list approach. The array search method can execute a much larger number of instructions than the linked-list method in that the array requires as many as:

(N number of PGC objects—A PGC number)*(number of parental blocks*size of each block), where N is the total number of PGC objects and A is the desired number of PGC objects. The linked list method requires only the total number of PGC objects less than the desired PGC number of instructions to be executed.

Accordingly, what is needed is an improved method and system for searching for PGC objects within defined blocks stored on DVD content. Furthermore, what is needed is a method and system for notating or marking PGC objects to improve search operations over the prior methods that failed to mark PGC objects.

SUMMARY OF THE INVENTION

In accordance with the present invention, a digital versatile disc (DVD) playback apparatus is disclosed for searching program chain (PGC) objects within a DVD content source. The DVD playback apparatus includes a DVD reader for reading a DVD content source and a user input device for receiving user commands. The DVD content source comprises a plurality of PGC objects and the DVD playback apparatus is able to search among the PGC objects using the following mechanisms. A PGC object pointer allocating mechanism is provided that is configured to allocate a unique pointer to each PGC object on the DVD content source. Once the PGC object pointers are allocated, a PGC search mechanism, which is coupled to the PGC pointer allocating mechanism, performs searches for a requested PGC object using a pointer assigned to the desired PGC object in response to a user search request command. Selected of the PGC objects are allocated to at least one data block while the remaining are considered to be non-block objects. The PGC pointers are place within a linear array for searching.

In accordance with another aspect of the invention, the PGC object searching mechanism and pointer allocation mechanisms allow a user to search through parental control ratings matching specific PGC objects for playback of a given title on the DVD content source. The pointer mechanism and search mechanism allow the DVD player to quickly locate the desired PGC objects associated with the selected rating. Typically, the ratings for a given title are stored within a block.

In accordance with another aspect of the present invention, a method for searching DVD program chain objects stored on a DVD content source is also disclosed. The method comprises the steps of allocating a unique pointer to each PGC object, placing the unique pointers within a linear pointer array, and searching the linear pointer array for the given PGC object in response to a search request. The method may also place selected ones of the PGC objects in a desired data block for search purposes. In one contemplated embodiment, the PGC objects provide a plurality of parental level viewing options for a given title. These parental level viewing options conform to a rating system consisting of G, PG, PG13, R, NC17, and NR ratings. A computer program product embodying the method steps is also disclosed. The computer program product enables a computer to be uniquely programmed to carry out the method steps using program codes stored on the computer program product.

BRIEF DESCRIPTION OF THE DRAWINGS

The above and further advantages of the invention may be better understood by referring to the following description in conjunction with the accompanying drawings and which:

FIG. 4 is a flow chart illustrating the method of optimizing a linear array for program chain object searching within DVD content;

FIG. 6 is a flow chart depicting the search method according to the present invention.

DETAILED DESCRIPTION OF THE PREFERRED EMBODIMENT

Figure 2:
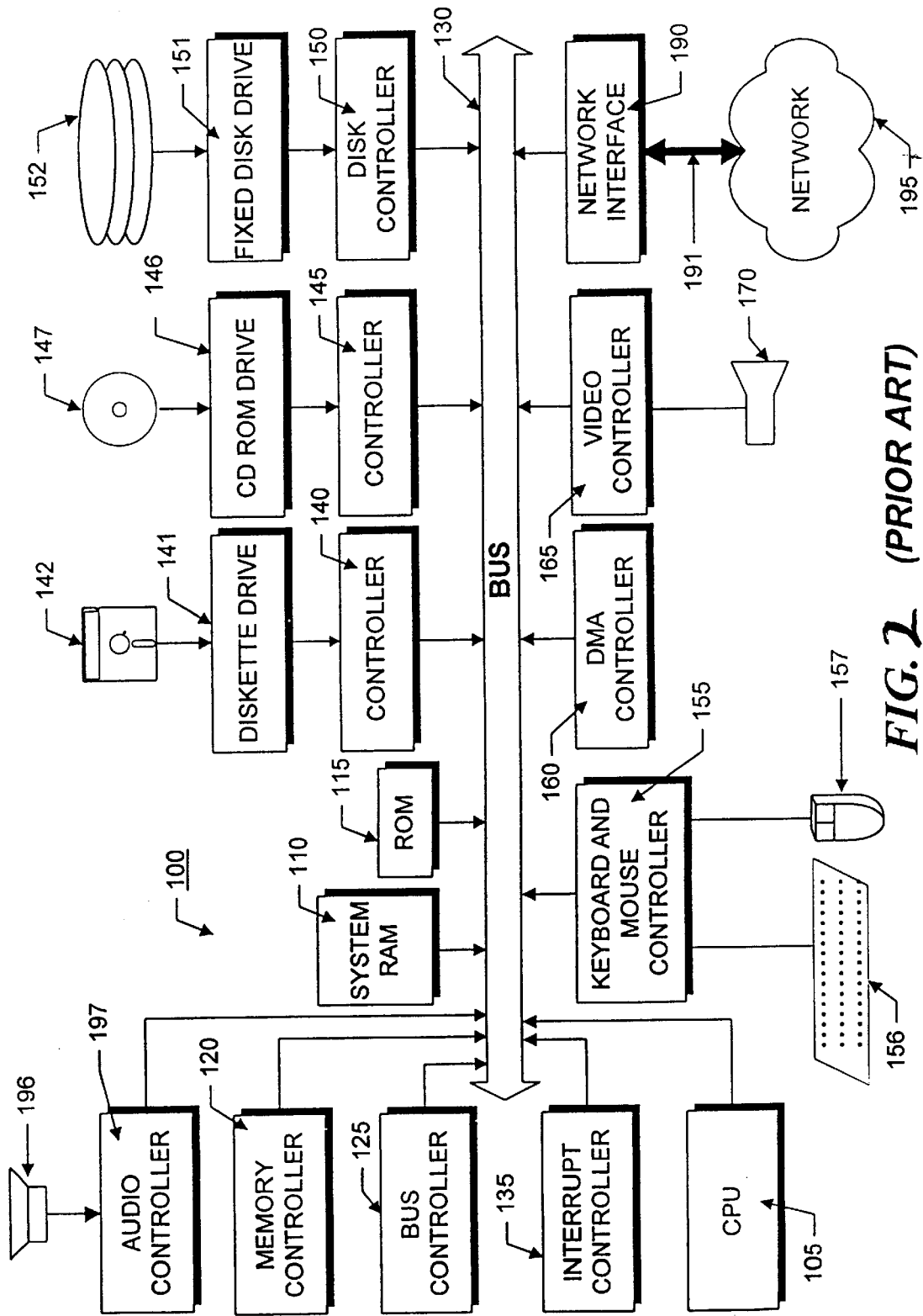
FIG. 2 is a block diagram of a computer system suitable for use with the present invention.

FIG. 2 illustrates the system architecture for a computer system 100 such as an IBM PS/2®, on which the invention may be implemented. The exemplary computer system of FIG. 2 is for descriptive purposes only. Although the description may refer to terms commonly used in describing particular computer systems, such as an IBM PS/2 computer, the description and concepts equally apply to other systems, including systems having architectures dissimilar to FIG. 3.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of the computer system 100 is generally controlled and coordinated by operating system software, such as the OS/2® operating system, available from International Business Machines Corporation, Boca Raton, Fla. The operating system controls the allocation of system resources and performs tasks such as processing, scheduling, memory management, networking, and I/O services, among other things. In particular, an operating system resident in system memory and running on CPU 105 coordinates the operation of the other elements of computer system 100. The present invention may be implemented with any of a number of commercially available operating systems, including OS/2, UNIX, and DOS, etc. One or more applications such as Lotus Notes, commercially available from Lotus Development Corp., Cambridge, Mass., may execute on the computer system 100. If the operating system is a true multitasking operating system, such as OS/2, multiple applications may execute simultaneously.

Figure 3:
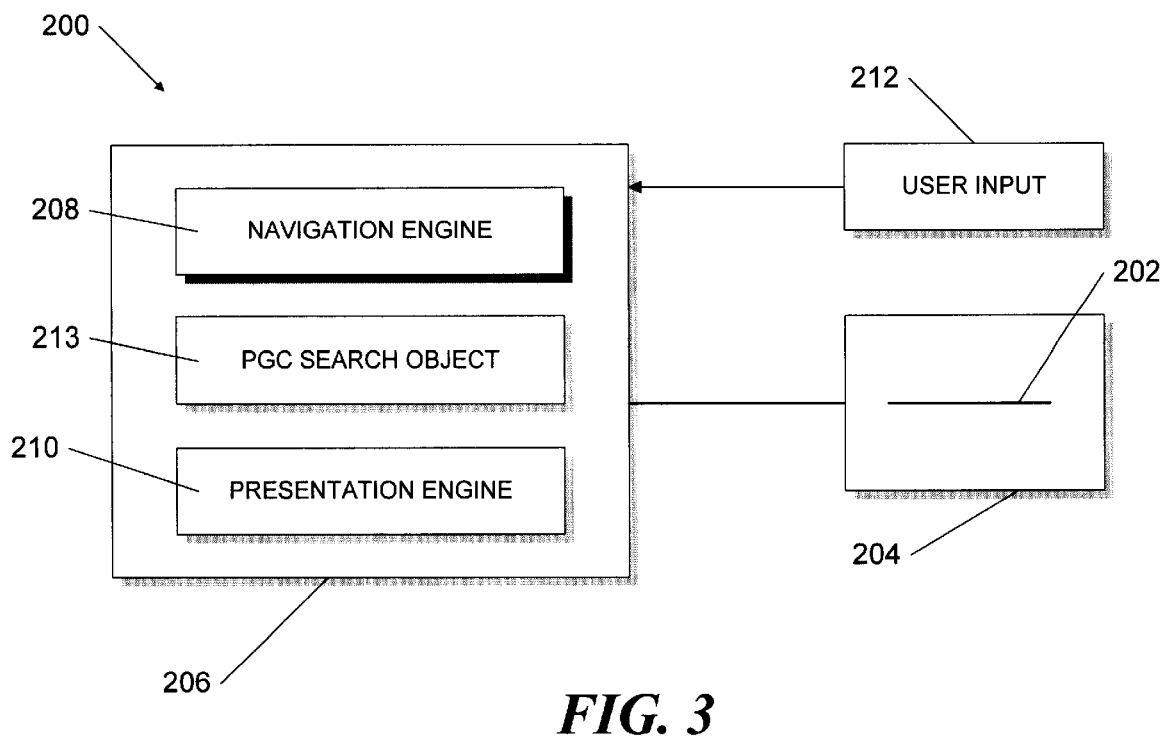
FIG. 3 is a conceptual diagram of the elements comprising a DVD system including a DVD drive and an accompanying computer with software components installed therein.

FIG. 3 illustrates conceptually the main components of a system 200 in accordance with the present invention. FIG. 3 shows a DVD-ROM drive 204 connected to a computer 206. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for read-only discs and disc 202 preferably contains up to seventeen gigabytes of information. The computer 206 includes a driver (not shown) for enabling the operating system in the computer 206 to control and exchange information with the drive 204. It also includes one or more input devices 212 that receive input from a user.

The computer 206 also includes a control and playback program shown schematically in FIG. 3 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression (also known as "Dolby® Digital" decompression). The video information may be compressed using a compression technique known as MPEG-2 (Moving Picture Experts Group-2).

In an illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor that uses the corresponding class definition and additional information, such as arguments provided during object creation, to construct the object. Likewise, objects are destroyed by a special function called a destructor. Objects may be used by using their data, attributes, or invoking their functions, or methods. When an object is created at runtime, memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which accesses the object's private data. The public functions form a controlled and consistent interface between the private data and the "outside" world. Any attempt to write program code which directly accesses the private variables causes the compiler to generate an error during program compilation. The error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped"

in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In accordance with the principles of the present invention, DVD system 200 includes a program chain (PGC) search object 213, which encapsulates PGC objects and is used by a search thread to process the selection of PGC objects desired in a search request. A particular PGC object may be searched, for example, by a user making a request through user input 212. For PGC searches not within a particular data block, such as, for example, a parental block as noted in the background of the invention, a linear search is performed for the desired PGC object. A linear array of PGC objects allows each object to be directly referenced by a simple pointer offset. For performing PGC searches within a particular data block, such as, for example, a parental block, a linear search may also be performed. Within the DVD specification, only the first PGC object is directly referenced within a particular data block. To overcome the limitation of only being able to select the first PGC object within a particular data block, the method of searching selects the first PGC within the desired block to be searched. Once the appropriate data block has been found, the method begins searching within the desired data block in which the particular PGC object is located per the data block object descriptor. The search is in contrast to sequentially looking at each PGC object within the selected block. Once the search correctly selects the desired PGC object, the parental object points directly to the next PGC object to process, which avoids calculating how many PGC objects that are skipped.

Figure 5:
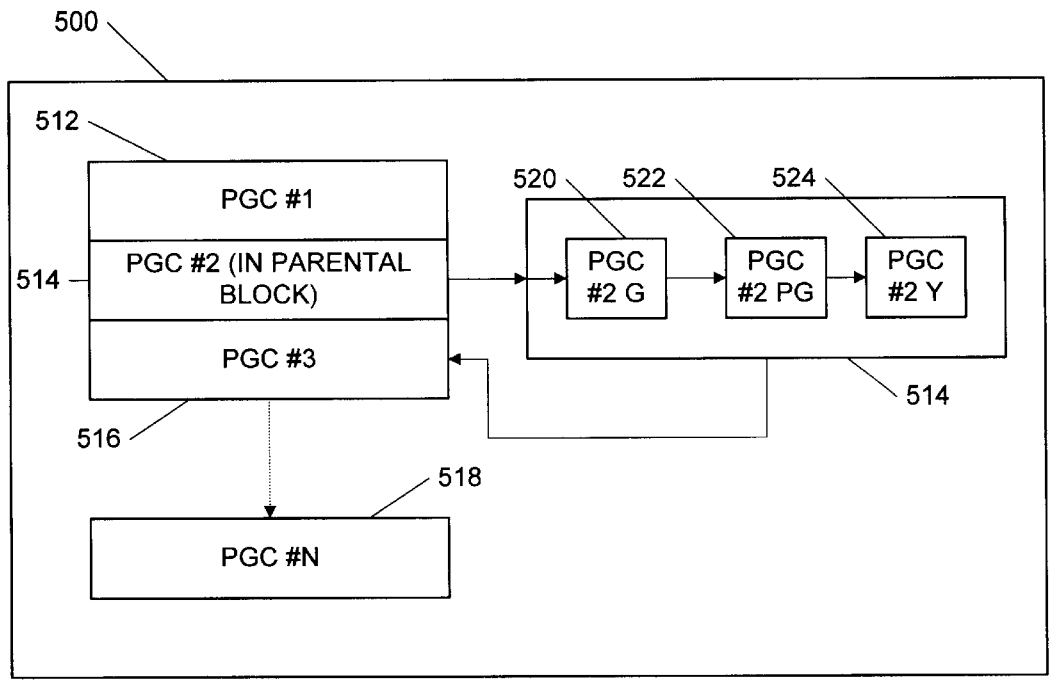
FIG. 5 is a conceptual diagram of program chain objects stored within parental blocks as disclosed in the present invention.

FIG. 4 depicts a flow chart of the method for optimizing data objects searches within DVD content according to the principles of the invention. Associated with the flow chart of FIG. 4 is a block diagram illustrated in FIG. 5. The block diagram of FIG. 5 is a conceptual diagram of the data blocks (parental blocks) 500 and the parental block objects 502 associated with a particular parental block 500. The illustrative example is set forth in terms of parental blocks, parental block objects, and parental levels. Generally, the process is utilized to search for program chain objects 512, 515, 516, 518 within data blocks where the program chain objects are associated with particular data block objects. The process begins in step 400 and proceeds to step 402, where a linear array of pointers 514 to each PGC object 520, 522, and 524 is allocated. For each PGC object 512–518, the method performs steps 402–414. Proceeding to step 404, the method determines if the PGC object is part of a particular parental block. If the PGC object is part of a given parental block, the method proceeds to step 406, where the method creates a parental block object. Next, in step 408, the method attaches each subsequent PGC object within the associated parental block object. The method then proceeds to step 410. In step 410, the parental block object tracks the parental level associated with the PGC object. After tracking the parental level, the parental block object, in step 412, sorts the PGC objects according to its parental level. Once each PGC object is sorted according to its parental level, each PGC object, per step 414, can be directly indexed via the current parental setting. The method then returns to step 402 for the next PGC object to be indexed.

After the last PGC object within a parental block has been processed, the parental block object, according to step 416, is updated to point to the next PGC object to process. Once the last PGC object has been processed, the system finishes in block 418.

Once the linear array of PGC objects has been created, each object may be directly referenced by a simple pointer offset. The method for performing a search for a particular PGC object within the linear pointer array is depicted in the flow chart of FIG. 6. Beginning in step 600, the method proceeds to step 602, where the user initiates a search request. After the search request has been initiated, the method proceeds to step 604. The system looks for each PGC object that is either outside the parental blocks or selects the first PGC in the appropriate parental block using the pointer. If the PGC object is not in the parental block, then in step 606, the search object uses direct pointer addition to locate the desired PGC object and return it for prompt processing. If the PGC object is in a parental block object, the system then selects the parental block object associated with the particular PGC object. Next, in step 608, the searcher object directly accesses the PGC object indexed to the parental level as opposed to looking at each PGC object stored within the parental block object. Once the desired PGC object is selected, it is then sent, in step 610 for processing. Once the processing has completed, the parental object, in step 612, points directly to the next PGC object within the parental block object to process the PGC object. The search process eliminates the need to determine how many PGC objects must be skipped over in order to reach the next appropriate PGC object.

Accordingly, what is provided according to the principles of the invention is a notation system for providing PGC object indexing. The indexing forms the basis in which PGC object searching is performed in an established linear array or through selected data block objects, such as the parental block objects of FIG. 5.

The notation and searching solutions overcome the limitations and inefficiencies of the prior art methods of either utilizing a linked list search approach or the searching of an entire array. The method provides an optimal searching technique for searching through data object blocks not heretofore provided in the prior art. It achieves certain advantages over the prior art solutions such as the following. Firstly, the method utilizes an efficient linear search approach for searching any PGC object within the linear pointer array. Secondly, the method eliminates the tedious and time consuming checking of each and every PGC object to determine that is the particularly desired PGC object within a given data block object. Thirdly, the search method allows for a quick exit from the parental block during a search procedure by only selecting those PGC objects located within the parental block. The search method eliminates the need to evaluate each and every PGC object that is stored either within the selected parental block object or outside that particular block object.

Figure 7:
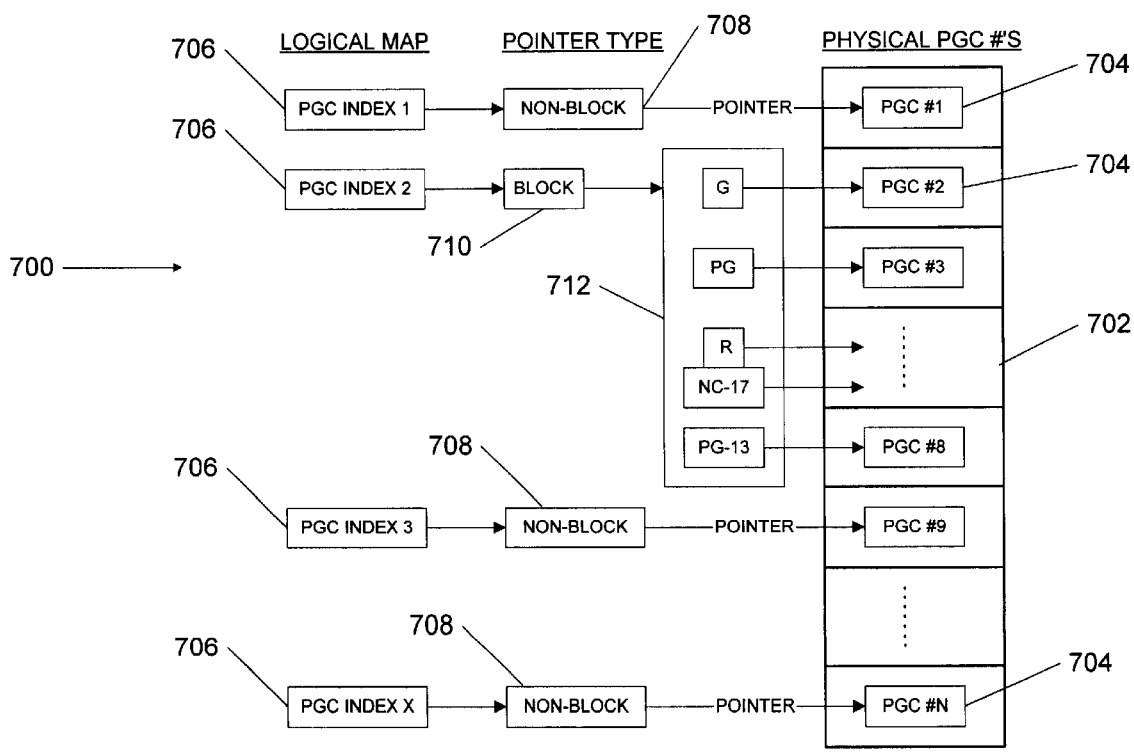
FIG. 7 is a conceptual diagram of the logical mapping of the physical location of the PGC chains on the DVD content in accordance with the present invention.

A logical mapping 700 of the PGC indexes to the physical PGC #'s located on the DVD content source is conceptually illustrated in FIG. 7. The physical location 702 displays a linear representation of PGC objects 704. N PGC objects 704 are located within linear array 702. The PGC objects are parsed from the DVD content during playback. Logical Map 700 represents the logical view of data stored in array 702. Thus, if the title requests PGC #3, the player looks for PGC index 3 from the PGC index values 706. Logical PGC index 3 then points to the mapped physical location of the PGC object 704.

Two types of pointers are provided to map from the logical map to the physical objects. The first pointer is a non-block pointer 708 that points directly to the physical PGC object 704 associated with it. The second pointer is a block pointer 710, which points to PGC objects 704 located within a block. If the desired PGC object 704 is in a block, then pointer 710 points to an array 712, which can be indexed by parental settings to access the appropriate PGC object. In this example, index 2 of PGC index 706 uses block pointer 710 to point to array 712. Within array 712 are the complement of possible parental ratings where the G-rated content points to PGC #2 of PGC objects 704 and the PG-13 rated content points to PGC #8 of the PGC objects 704.

Within current DVD specifications, a maximum of sixteen data blocks can be located on a DVD disc. The method for searching is not limited to sixteen blocks, but is designed to search through N blocks where N is the total number of blocks stored on the DVD disc. Likewise, the method may also search through Y number of PGC objects stored within a given block, where Y is the total number of PGC objects stored therein. Furthermore, the illustrative example is directed at PGC objects based on parental level control, but is generally applicable to searching for PGC objects stored within data object blocks. For example, another type of data object block may include selected foreign language options that allow a user to select a particular foreign language. The system then performs a search for the PGC objects associated with that foreign language block object. Additionally, the PGC objects may be associated with a particular level of educational content. For example, educational skills discs, such as a math, reading, or writing skills tutorial disc, can offer instruction and help at the elementary school level, middle school and high school levels, as well as the introductory college level. The different levels of content are associated with given PGC objects that are then selected and searched rapidly using the searching method based upon the indexing method according to principles of the invention. One example of an alternative use is where multiple viewing angles are provided on the content source. A user can select a front, back, side, top, or standard view using the mapping scheme in accordance with principles of the invention.

Figure 1:
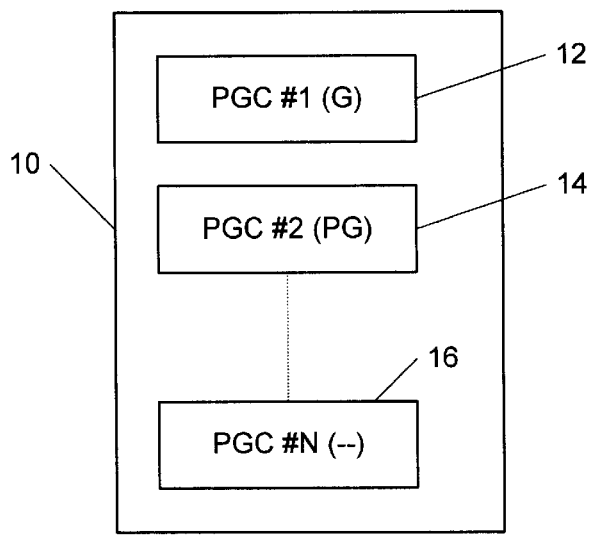
FIG. 1 is a block diagram of a parental block object having a plurality of program chains within according to the prior art.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 either can be a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be reliably substituted. Further, the methods of the invention may be achieved in either all software implementations, using the appropriate processor instructions, or in hybrid implementations which utilize a combination of hardware logic and software logic to achieve the same results. Hardware implementations may include a microprocessor in combination with various support circuitry, a single-chip microcontroller, hybrid circuits which employ packaging techniques other than plastic- or ceramic-encapsulated packaging, or application specific integrated circuits (ASICs). The ASICs may take the PGC object information may be stored within a selected linear pointer array or the search system may employ separate mechanisms for defining the linear pointer array and then performing the searching therein. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. A digital versatile disc playback apparatus having a DVD reader for reading a DVD content source and a user input device for receiving user commands, the DVD content source comprising a plurality of program chain (PGC) objects, the DVD playback apparatus comprising:

a PGC parental block pointer allocating means configured to allocate a unique pointer to each PGC on the DVD content source;

a PGC parental block search means, coupled to the PGC object pointer allocating mechanism to search for a requested PGC object using a pointer assigned to the selected PGC object in response to a user search request command; and a linear pointer array defined in memory and having a plurality of entries, each ventry storing only a unique PGC object pointer and being accessible with an address offset from an adjacent entry of the linear pointer array.

2. The apparatus of claim 1 wherein selected of the PGC objects are allocated to a desired data block.

3. The apparatus of claim 2 wherein the PGC search mechanism selects the desired data block associated with the PGC pointer being searched.

4. A digital versatile disc playback apparatus having a DVD reader for reading a DVD content source and a user input device for receiving user commands, the DVD content source comprising a plurality of program chain objects, the DVD playback apparatus comprising:

a PGC parental block pointer allocating mechanism configured to allocate a unique pointer to each PGC object on the DVD content source;

a PGC parental block search mechanism, coupled to the PGC parental block pointer allocating mechanism, to search for a parental block using a pointer assigned to a selected PGC object associated with the parental block; and a linear pointer array defined in memory and having a plurality of entries, each entry storing only a unique PGC object pointer and being accessible with an address offset from an adjacent entry of the linear pointer array.

5. The apparatus of claim 4 wherein the parental blocks determine a parental viewing title selected from the group consisting of G, PG, PG13, R, NC17, and NR ratings.

6. A method for searching digital versatile disc (DVD) program chain (PGC) objects stored on a DVD content source, comprising the steps of:

(a) allocating a unique pointer to each PGC object associated with a parental block;

(b) defining in memory a linear pointer array for storing PGC object pointers;

(c) placing only the unique pointers within the linear pointer array; and (d) in response to a search request for a given PGC object associated with a parental block, searching the linear pointer array for the given PGC object by utilizing an address offset from an adjacent entry of the linear pointer array.

7. The method of claim 6 further comprising the step (d) placing selected ones of the PGC objects in a data block.

8. The method of claim 6 wherein selected of the PGC objects provide a plurality of parental level viewing options for a given title.

9. The method of claim 8 wherein the plurality of parental level viewing options are selected from the group consisting of G, PG, PG13, R, NC17, and NR ratings.

10. The method of claim 6 where (c) comprises:

(c1) selecting a first PGC object in an, appropriate parental block using one of the pointers; and (c2) directly accessing the PGC object indexed to the desired parental level.

11. A computer program product having computer readable program code stored on a computer useable medium to perform digital versatile disc (DVD) program chain (PGC) object searches stored on a DVD content source, the computer program product on the medium comprising:

program code to allocate a unique pointer to each PGC object associated with a parental block;

program code to define in memory a linear pointer array for storing PGC object pointers;

program code to place only the unique pointers within the linear pointer array; and program code to search the linear pointer array for a given PGC object associated with a parental block by utilizing an address offset from an adjacent entry of the linear pointer array.

12. The computer program product of claim 11 further comprising program code to place selected ones of the PGC objects in a data block.

13. The computer program product of claim 11 wherein selected of the PGC objects provide a plurality of parental level viewing options for a given title.

14. The computer program product of claim 13 wherein the plurality of parental level viewing options are selected from the group consisting of G, PG, PG13, R, NC17, and NR ratings.

15. The computer program product of claim 11 wherein the program code to search the linear pointer array further comprises:

program code for selecting a first PGC object in an appropriate parental block using one of the pointers; and program code for directly accessing the PGC object indexed to the desired parental level.

* * * * *